UNITED STATES PATENT OFFICE.

CECIL O. PHILLIPS, OF NEW YORK, N. Y.

RECOVERY OF OIL FROM COPRA.

1,369,265.  Specification of Letters Patent.  Patented Feb. 22, 1921.

No Drawing.  Application filed May 17, 1919. Serial No. 297,936.

*To all whom it may concern:*

Be it known that I, CECIL O. PHILLIPS, a citizen of the United States, residing at New York city, in the county of New York, State of New York, have invented certain new and useful Improvements in Recovery of Oil from Copra; and I do hereby declare the following to be a full, clear, and exact description of the invention, such as will enable others skilled in the art to which it appertains to make and use the same.

This invention relates to improvements in the extraction of oil from copra. The invention is based upon the discovery that the extraction of oil from copra can be materially improved and the amount of oil extracted somewhat increased by treating the copra with a small amount of a dilute solution of an alkali and more particularly with a dilute solution of an akali carbonate or bicarbonate.

In the extraction of oil from copra, as commonly practised, the copra is ground and heated and subjected to two or more pressing operations at a temperature of, for example, about 55 to 60° C.

According to the present invention the ground copra is treated with a small amount of the dilute alkaline solution prior to one of the heating operations, and this solution is intimately admixed with the ground copra. The copra with the alkaline solution thus intimately admixed is then subjected to the usual heating or cooking operation for preparing the copra for pressing and is then expressed for the removal of the oil therefrom. In the preferred embodiment of the invention the dilute alkaline solution is incorporated with the ground meats subsequent to the first pressing and prior to the second pressing, so that the ground meats after the removal of a considerable portion of the oil, are subjected to the dilute alkaline solution in the further heating operation and prior to the subsequent expression of the greater portion of the remaining oil.

The dilute alkaline solution which is particularly recommended is a solution of sodium bicarbonate, containing about one-tenth of a pound of sodium bicarbonate to the gallon and using about five gallons of the solution per ton of material going to the presses for the second pressing.

In the practice of the invention the copra may be ground or pressed in the customary manner and may then be heated and subjected to the first pressing operation at a temperature of, for example, about 55 to 60° C. for the removal of the pressed portion of the oil. The press cake from the first pressing is then intimately admixed with the dilute solution of sodium bicarbonate and after admixture the material may then be subjected to a further heating before going to the presses for the second pressing operation. The partially extracted copra is accordingly subjected to a second heating or cooking operation in admixture with the added dilute alkaline solution, so that this solution is present during the heating or cooking operation and during the subsequent second pressing.

As a result of the improved process of the present invention, the amount of oil obtainable is somewhat increased and the amount of oil remaining in the press cake is correspondingly reduced, while the press cake itself is improved somewhat in its appearance and in its properties, so that its value is likewise increased.

Instead of using a dilute solution of sodium bicarbonate, other dilute alkaline solutions can be similarly employed; for example, solutions of sodium carbonate or soda ash, caustic soda, lime, etc., in corresponding amounts. There may thus be employed an equivalent amount of caustic soda or normal sodium carbonate or a solution of or suspension of lime or calcium oxid containing about 5 per cent. calcium oxid.

The process of the present invention is similarly applicable to the recovery of palm oil from palm kernels.

It will be evident that the amount of the alkaline solution can be somewhat varied, as well as the strength of the solution employed, and that the solution can be sprayed or otherwise uniformly and intimately distributed throughout the entire mass of the ground material, so that the desired uniform action will be obtained. It will, accordingly, be evident that no material change will be required in the common methods of procedure and in the apparatus commonly employed, except provision for supplying and intimately incorporating the dilute alkaline solution.

The utilization of the dilute alkaline solutions, according to the present invention, has the further advantage of enabling a regulated amount of moisture to be incorporated with the ground copra and this added and regulated amount of moisture I consider to be one of the advantages which the present invention presents. It will be evident, however, that this amount of water may be increased or decreased somewhat, in accordance with the particular character of the copra treated.

Having thus described my invention, what I claim is:—

1. The method of improving the extraction of oil from copra, which comprises intimate admixing with the ground copra a small amount of a dilute alkaline solution, and subjecting the copra to a heating and pressing operation; substantially as described.

2. The method of improving the extraction of oil from copra, which comprises subjecting the ground copra to a first pressing operation, then intimately incorporating with the resulting press cake a small amount of a dilute alkaline solution, and subjecting the resulting material to a second pressing operation; substantially as described.

3. The method of improving the extraction of oil from copra, which comprises intimately admixing with the copra press cake after the first pressing operation, a small amount of a dilute alkaline solution, and then subjecting the resulting product to a further heating and pressing operation; substantially as described.

4. The method of improving the extraction of oil from copra which comprises subjecting the copra to a first pressing operation, then intimately incorporating with the press cake a small amount of a dilute solution of sodium bicarbonate and subjecting the resulting product to a second pressing operation; substantially as described.

In testimony whereof I affix my signature.

CECIL O. PHILLIPS.